United States Patent
Wånelid

[11] Patent Number: 6,137,066
[45] Date of Patent: Oct. 24, 2000

[54] WEIGHING DEVICE

[75] Inventor: Kent Wånelid, Skara, Sweden

[73] Assignee: Vagagenturen Wanelid AB, Skara, Sweden

[21] Appl. No.: 09/331,320

[22] PCT Filed: Dec. 17, 1997

[86] PCT No.: PCT/SE97/02128

§ 371 Date: Jul. 29, 1999

§ 102(e) Date: Jul. 29, 1999

[87] PCT Pub. No.: WO98/29714

PCT Pub. Date: Jul. 9, 1998

[30] Foreign Application Priority Data

Dec. 18, 1996 [SE] Sweden .................................. 9604662

[51] Int. Cl.[7] .......................... G01G 23/18; G01G 19/52; G01G 13/22; G01G 19/03
[52] U.S. Cl. .............................. 177/45; 177/50; 177/125; 177/132; 702/101; 702/175
[58] Field of Search ................... 177/45, 50, 125, 177/132, 133, 134; 702/101, 175

[56] References Cited

U.S. PATENT DOCUMENTS

| | | |
|---|---|---|
| 4,049,069 | 9/1977 | Tamamura et al. ..................... 177/134 |
| 4,526,244 | 7/1985 | Chauveau ..................... 177/1 |
| 4,754,822 | 7/1988 | Altenpohl et al. ....................... 177/145 |
| 4,794,996 | 1/1989 | Wallace et al. ............................. 177/50 |
| 5,002,141 | 3/1991 | Loshbough et al. .............. 177/210 FP |
| 5,109,936 | 5/1992 | Ruppel ....................................... 177/50 |

FOREIGN PATENT DOCUMENTS

| | | |
|---|---|---|
| 0342561 | 11/1989 | European Pat. Off. . |
| 0691530 | 1/1996 | European Pat. Off. . |

*Primary Examiner*—Randy W. Gibson
*Attorney, Agent, or Firm*—Birch, Stewart, Kolasch & Birch, LLP

[57] ABSTRACT

The present invention relates to a method and a device for weighing moving objects wherein at least two measurements are carried out with respect to each object by means of separate weighing machines (1, 2), whereupon an average value is computed by a calculating unit (5) as the result of the weighing operation. The invention is intended for weighing mobile objects, such as vehicles (10) designed for road or rail-bound traffic, or for in-line weighing operations to weigh products on a conveyor belt.

6 Claims, 1 Drawing Sheet

WEIGHING DEVICE

This application is the national phase under 35 U.S.C. §371 of PCT International Application No. PCT/SE97/02128 which has an International filing date of Dec. 17, 1997 which designated the United States of America.

BACKGROUND OF THE INVENTION

1. Field of the Invention

The present invention relates to a weighing method and to a device for weighing mobile objects, such as goods vehicles designed for road or rail-bound traffic.

2. Description of the Background Art

To weigh moving objects, for instance goods vehicles, weighing devices comprising a large-size weighing machine traditionally are used, onto which the entire vehicles may be driven, come to a standstill and be weighed to be thereafter driven off. The disadvantages inherent in this common type of vehicle weighing machines are, above all, their dimensions. The weighing machine must have a length of 24 meter and a weighing capacity of up to 80 tons, which makes the weighing machine space-requiring, difficult to transport/mount, and expensive to manufacture and to service. In addition, it is awkward to check that the entire vehicle is actually positioned on the weighing machine during the weighing process.

Another type of weighing machine in use is a smaller weighing machine, the axle load meter, according to which the vehicle is driven continuously across the weighing machine. Each axle is weighed separately on the weighing machine. The total weight is then calculated by adding together the individual axle weight measurements. The disadvantage found with this type of vehicle weighing machine is, however, the sensitivity of the weighing machine to unevenness in the ground ahead of and after the weighing machine, since differences in height and resistance to rolling affect the axle load with respect to the axle present on the weighing machine, a situation which consequently makes the measurement results less reliable.

With respect to both weighing devices above regulations prescribe that check weighing be performed annually, using certified calibrated weights up to the maximum capacity of the weighing machine. In the case of a static (full length) vehicle weighing machine, this means 80 tons whereas in the case of a dynamic axle load meter a capacity of 15 tons suffices. Certification of weighing machine accuracy is a costly and time-consuming enterprise involving fork-lift trucks, freights and a verification controller authorised by the appropriate agency. For obvious reasons, accuracy certification of full-length weighing machines must always be performed in situ whereas axle load meters may be transported to the accuracy testing authority and the customer consequently may replace the weighing machine to be tested by a recently certified weighing machine, in accordance with a replacement system.

Should the weighing machine brake down during the duration of the period of certification, the certificate of weighing machine accuracy becomes invalid, and this goes for both types of weighing machines, and a new certification process must be initiated.

In addition, it may be difficult to know whether the results provided by the weighing machine are accurate or not. Snow, grit or the like underneath the weighing machine may affect the weighing machine so as to distort the weighing results. This is especially serious in connection with the type of weighing machines that measure the weight, axle by axle, since any system error in this case is multiplied by the number of axles involved.

SUMMARY AND OBJECTS OF THE PRESENT INVENTION

The present invention has for its object to completely or at least partly eliminate the above outlined problems inherent in the prior-art technology.

BRIEF DESCRIPTION OF THE DRAWING

The invention will be described in more detail in the following for exemplifying purposes with respect to one embodiment thereof and with reference to the accompanying drawing, wherein.

DETAILED DESCRIPTION OF THE PREFERRED EMBODIMENTS

Figure 1:
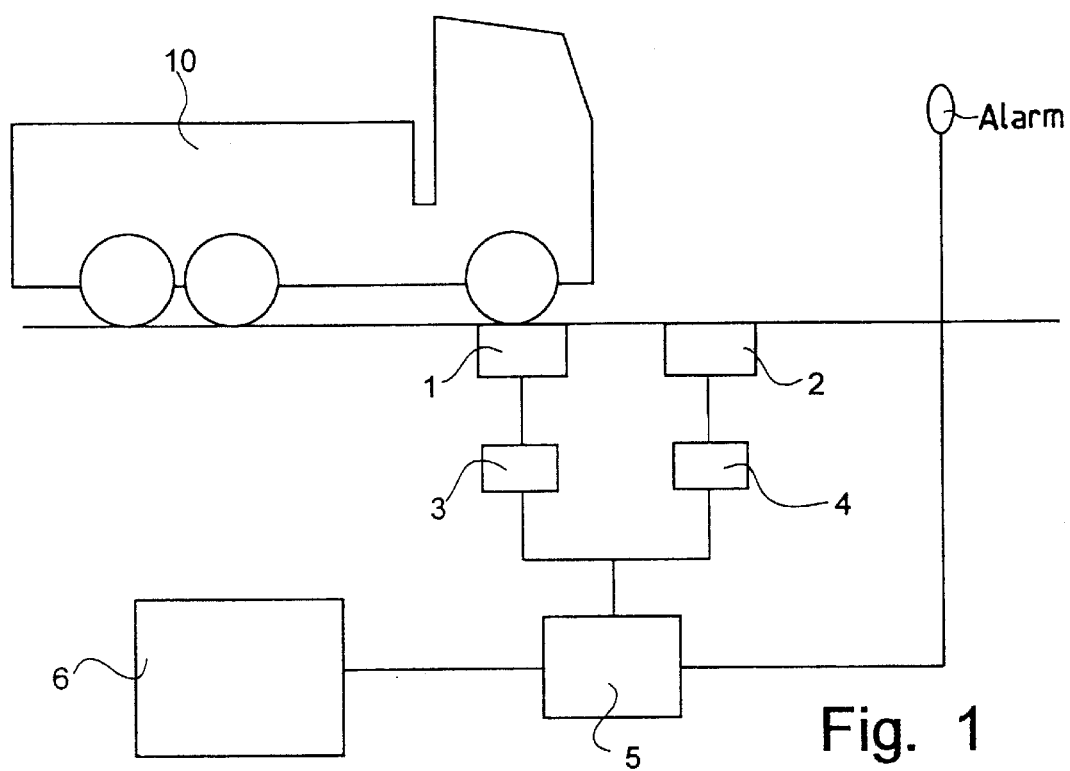
FIG. 1 is a schematic view of a weighing device in accordance with the invention.

As appears from FIG. 1, a weighing device in accordance with the invention comprises two weighing machines 1, 2, each one connected to its separate individual weighing instrument 3, 4. Each weighing machine is certified for accuracy as a separate weighing system and the weight results are transferred from the weighing systems to a common calculating unit 5. The weighing machines could be e.g. standard weighing machines that are adapted to read values representative of maximum weight and to transfer these values to the calculating unit. When a vehicle 10 is driven across the weighing machines, the value representative of maximum weight corresponds to the situation when one of the axles of that vehicle is located in its entirety on the weighing machine. Advantageously, the calculating unit 5 could be a computer capable of processing and storing the information received from the weighing machines. Processed information is subsequently displayed by being transmitted to an information presentation unit 6, which could be e.g. a display screen and/or a printer. Alternatively, the information presentation unit could be adapted for communication with other systems.

In use, a vehicle 10 is driven up to and onto the first weighing machine 1. When the first wheel axle passes the first weighing machine 1, the weight measurement results are read and transferred to the computing unit 5. In the same manner, the weighing machine 1 reads a maximum-weight value with respect to each axle, as the vehicle is driven across the weighing machine. When the vehicle arrives at the second weighing machine 2, the latter, in the same manner, reads the data representative of the weights measured with respect to each one of the wheel axles. Thus, weighing machines 1 and 2 individually read the values with respect to all wheel axles of the vehicle.

Subsequently, the calculating unit 5 compares the received values and computes the axles weights. If the difference between two readings with respect to one and the same axle exceeds a predetermined set value, an alarm function is activated, which may cause an alarm signal to be emitted to a warning device, for example a blinking light. Other ways of emitting error signals are, however, conceivable. The calculating unit then totals the axle weights in order to compute the total vehicle weight. Some axle weights may be added together separately, in order to produce separate weight measurement values with respect to e.g. the traction vehicle and the trailer.

The results are subsequently presented by being transferred from the calculating unit to a presentation unit, such as a display screen or a printer. The information may be presented in many different ways, depending on the conditions and on preferences. For example, the measurement results with respect to the axle weights may be presented separately for each axle, the weights of the vehicle and of the trailer may be presented individually, the total weight may be presented, and so on.

The warning function may be designed to emit a warning as soon as the differences between two measurement results with respect to the same axle deviate by more than a predetermined value. Alternatively, a warning may instead be emitted, when the difference in the measured total weight exceeds a predetermined value, or the like. When a warning signal is emitted, the driver may choose either to repeat the measurement, i.e. to back the vehicle and restart the weighing procedure, or to call for help from the weighing machine operator.

Essentially two advantages are gained from the weighing device in accordance with the invention compared with conventional weighing machines.

Even if one of the weighing platforms becomes defective or is being serviced, the weighing system may still be used, its certificate still being valid, and with a performance accuracy equivalent to that of axle load meters constructed in accordance with conventional methods.

The most important advantage offered by the invention is, however, the improved reliability of the measurement results, on the one hand because the average value of results from several weighing operations probably is more accurate than those from one single weighing operation, and on the other that a warning of possible error is emitted as soon as the difference in the weighing results exceeds a predetermined value. Owing to this arrangement, any fault in the weighing machines will receive immediate attention, since it is not very likely that both weighing machines show the same error at the same time and above all, it is not likely that their measurement errors are of equal magnitude.

The invention has been described in the aforegoing with respect to one embodiment. Several varieties of the invention are, however, possible. For example, two weighing machines constructed in accordance with conventional technology could be interconnected in a weighing device in accordance with the invention, although smaller and more easily manageable weighing machines are preferred. More than two weighing machines may also be used in order to further improve the reliability of the results. It is likewise conceivable to apply the invention to other areas, such as for example in-line weighing of meat, cheese, fish and other products. This kind of related varieties must be regarded to be embraced by the invention as the latter is defined in the appended claims.

What is claimed is:

1. A weighing device designed for weighing moving vehicles (10), characterised in that it comprises at least two separately weighing machines (1, 2) arranged in such a manner that the vehicles to be weighed are weighed successively by each weighing machine (1, 2), said weighing machines (1, 2) being connected to a calculating unit (5) and adapted to transfer the weighing results to said unit, said calculating unit (5) arranged to compute a combined weighted value of these weighing operations and to transmit said value to a presentation unit (6), which is one of a display screen or a printer, and wherein when the difference between the measurement results obtained from different weighing machines with respect to one and the same object exceeds a predetermined preset value, said calculating unit (5) is arranged to generate an error signal activating an error warning means.

2. A weighing device as claimed in claim 1, characterised in that the weighing machines (1, 2) are arranged to weigh the objects as the latter move continuously across said weighing machines.

3. A weighing device as claimed in claim 1, characterised in that it is intended to weigh rolling vehicles, the calculating device being arranged to calculate part results with respect to each individual axle of the vehicle (10) and, by adding together these part results, to compute suitable aggregated values, such as the weight of discrete carriages or the entire vehicle.

4. A method of weighing moving vehicles, characterised in that at least two measurements of the vehicle weight are performed by means of separate weighing machines (1, 2), whereupon an average value is computed as the weighing result, and in that an error warning is issued, should the difference between the results from the different weighing operations with respect to one and the same vehicle exceed a predetermined value.

5. A weighing method as claimed in claim 4, characterised in that the weighing operation takes place while the vehicle rolls continuously across the weighing device.

6. A weighing method as claimed in claim 4, characterised in that the weighing concerns weighing of rolling vehicles (10), at least two weighing operations being performed with respect to each individual vehicle axle, that the part results concerning the weight of each axle are calculated, and that these part results are added together to form different aggregated values, which are one of the weight of the traction vehicle, of the trailer, or of the entire vehicle train.

\* \* \* \* \*